US011175673B2

(12) United States Patent
Eshima (10) Patent No.: US 11,175,673 B2
(45) Date of Patent: Nov. 16, 2021

(54) DRIVE ASSIST APPARATUS (71) Applicant: TOYOTA JIDOSHA KABUSHIKI KAISHA, Toyota (JP)

(72) Inventor: Kazuhito Eshima, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 16/142,250

(22) Filed: Sep. 26, 2018

(65) Prior Publication Data
US 2019/0146516 A1 May 16, 2019

(30) Foreign Application Priority Data

Nov. 15, 2017 (JP) .............................. JP2017-219977

(51) Int. Cl.
G05D 1/02 (2020.01)
G08G 1/14 (2006.01)
B62D 15/02 (2006.01)
G08G 1/16 (2006.01)

(52) U.S. Cl.
CPC ....... G05D 1/0225 (2013.01); B62D 15/0285 (2013.01); G05D 1/0223 (2013.01); G08G 1/143 (2013.01); G08G 1/166 (2013.01); G08G 1/168 (2013.01)

(58) Field of Classification Search
CPC ............... G05D 1/0225; G05D 1/0223; B62D 15/0285; G08G 1/166; G08G 1/143; G08G 1/168; B60W 30/06
See application file for complete search history.

(56) References Cited

U.S. PATENT DOCUMENTS

| 2010/0156672 | A1 | 6/2010 | Yoo et al. |
| 2015/0149265 | A1* | 5/2015 | Huntzicker ............. G06F 21/33 705/13 |
| 2016/0144857 | A1 | 5/2016 | Ohshima |
| 2017/0200367 | A1* | 7/2017 | Mielenz ............... G05D 1/0246 |
| 2017/0323567 | A1 | 11/2017 | Nordbruch |

FOREIGN PATENT DOCUMENTS

| CN | 106414201 A | 2/2017 |
| DE | 102012222562 A1 | 6/2014 |
| DE | 102015201204 A1 | 7/2016 |
| EP | 2974944 A1 | 1/2016 |
| JP | 2006-031412 A | 2/2006 |
| JP | 2006048494 A | 2/2006 |
| JP | 2011-108016 A | 6/2011 |
| JP | 2013-109705 A | 6/2013 |
| JP | 2016-53755 A | 4/2016 |
| JP | 2016-099953 A | 5/2016 |
| JP | 2017-526569 A | 9/2017 |
| WO | 2016/066350 A1 | 5/2016 |

* cited by examiner

*Primary Examiner* — Peter D Nolan
*Assistant Examiner* — Clarence D McCray
(74) *Attorney, Agent, or Firm* — Sughrue Mion, PLLC (57) ABSTRACT

A drive assist apparatus includes an electronic control unit configured to: acquire space availability information that indicates whether each of a plurality of parking spaces in a parking lot is an occupied space or a vacant space; and set at least one of a speed of a vehicle that moves in the parking lot and a moving route of the vehicle based on the space availability information.

9 Claims, 7 Drawing Sheets

DRIVE ASSIST APPARATUS

INCORPORATION BY REFERENCE

The disclosure of Japanese Patent Application No. 2017-219977 filed on Nov. 15, 2017 including the specification, drawings and abstract is incorporated herein by reference in its entirety.

BACKGROUND

1. Technical Field

The disclosure relates to a drive assist apparatus.

2. Description of Related Art

An apparatus has been suggested as an apparatus of this type (see Japanese Unexamined Patent Application Publication No. 2016-099953 (JP 2016-099953 A). For example, when a traffic direction for a one-vehicle-wide passage in a parking lot is set to one direction, the apparatus allows a vehicle to be driven autonomously. Alternatively, there has been suggested a parking lot system (see WO 2016/066350). In the parking lot system, a marker that indicates space availability information is provided in each parking space of a parking lot. Alternatively, there has been suggested a system (see DE Patent Application Publication No. 102015201204). The system monitors movement of a vehicle in a parking lot with sensors buried in passages of the parking lot, and controls movement of the vehicle in the parking lot. Alternatively, there has been suggested a system (see Japanese Unexamined Patent Application Publication No. 2006-031412 (JP 2006-031412 A)). In the system, when a vehicle moving route up to a vehicle stop location within a vacant parking space is transmitted from a parking control center to a vehicle that has entered from a parking entrance, the vehicle moves along the vehicle moving route with automatic steering.

SUMMARY

Incidentally, in a parking lot, a pedestrian can possibly run out from behind a parked vehicle. In the above-described Description of Related Art, a pedestrian's run out is not taken into consideration.

The disclosure provides a drive assist apparatus that is able to assist driving in consideration of a pedestrian's run out in a parking lot.

A drive assist apparatus according to a first aspect of the disclosure includes an electronic control unit configured to: acquire space availability information that indicates whether each of a plurality of parking spaces in a parking lot is an occupied space or a vacant space; and set at least one of a speed of a vehicle that moves in the parking lot and a moving route of the vehicle based on the space availability information.

A drive assist apparatus according to a second aspect of the disclosure includes: acquiring means configured to acquire space availability information that indicates a parking situation of each of a plurality of parking spaces in a parking lot; setting means configured to set at least one of a speed of a vehicle that moves in the parking lot and a moving route of the vehicle based on the space availability information; and controlling means configured to control an actuator such that the vehicle moves with automatic steering based on at least one of the speed and the moving route.

In the above aspect, a vehicle speed or a moving route is set based on space availability information of parking spaces. Parking situations indicated by the space availability information are linked with a possibility that a pedestrian runs out from behind a parked vehicle. That is, if there are a relatively large number of parked vehicles, there are a relatively large number of blind spots caused by parked vehicles, so a driver of the intended vehicle is difficult to recognize a pedestrian, and there is a high possibility that a pedestrian runs out without noticing a vehicle. On the other hand, if there are a relatively small number of parked vehicles, there are a relatively small number of blind spots caused by parked vehicles, so both the driver of the intended vehicle and a pedestrian are relatively easy to recognize each other. Therefore, according to the above aspect that takes space availability information into consideration, it is possible to assist driving in consideration of pedestrian's running out from behind a parked vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the drive assist apparatus will be described with reference to the accompanying drawings.

First Embodiment

A first embodiment of the drive assist apparatus will be described with reference to FIG. 1 to FIG. 5B.

Configuration

Figure 1:
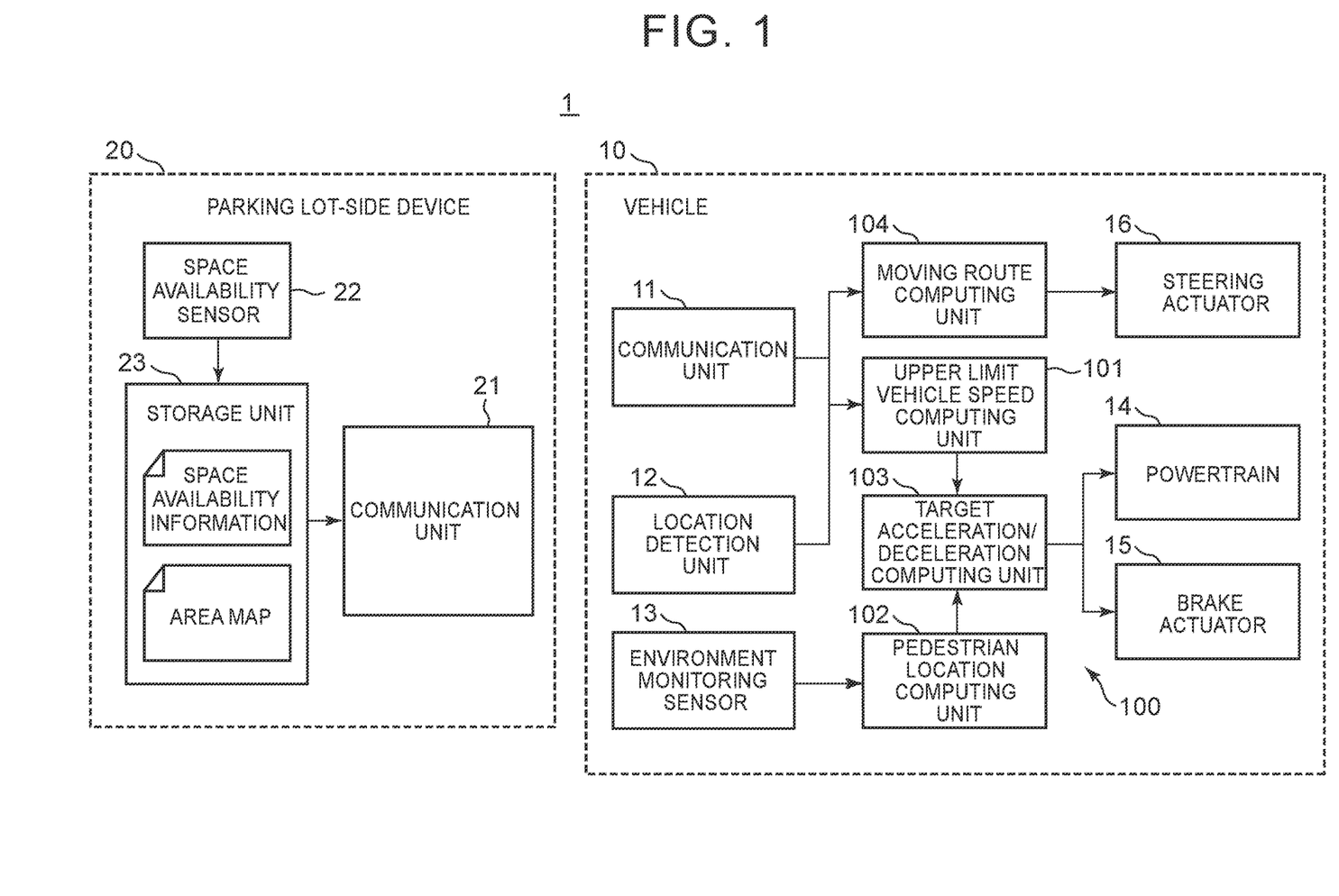
FIG. 1 is a block diagram that shows the configuration of a parking system according to a first embodiment.

The configuration of a drive assist apparatus according to the first embodiment will be described with reference to FIG. 1. FIG. 1 is a block diagram that shows the configuration of a parking system according to the first embodiment.

As shown in FIG. 1, the parking system 1 includes a vehicle 10 and a parking lot-side device 20. The vehicle 10 includes a communication unit 11, a location detection unit 12, an environment monitoring sensor 13, a powertrain 14, a brake actuator 15, a steering actuator 16, an upper limit vehicle speed computing unit 101, a pedestrian location computing unit 102, a target acceleration/deceleration computing unit 103, and a moving route computing unit 104. The upper limit vehicle speed computing unit 101, the pedestrian location computing unit 102, the target acceleration/deceleration computing unit 103, and the moving route computing unit 104 constitute the drive assist apparatus 100 according to the first embodiment. The parking lot-side device 20 includes a communication unit 21, a space availability sensor 22, and a storage unit 23.

The communication units 11, 21 are configured to be able to wirelessly communicate with each other. The location detection unit 12 includes, for example, a global positioning system (GPS) device. The location detection unit 12 is configured to be able to detect the location of the vehicle 10. The environment monitoring sensor 13 includes a device that is able to detect an object (particularly, pedestrian) around the vehicle 10. Examples of the device include a camera that captures an image outside of the vehicle 10, a laser sensor, a millimeter-wave sensor, and an ultrasonic sensor. Existing technologies are applicable to the powertrain 14, the brake actuator 15, and the steering actuator 16, so the detailed description thereof is omitted.

The space availability sensor 22 includes, for example, a sensor (for example, pressure-sensitive sensor, or the like) buried in each parking space of a parking lot, a camera installed at a location at which the camera is able to take a bird's eye view of each parking space, or the like. The space availability sensor 22 is configured to be able to detect whether a parked vehicle is present in each parking space. The space availability sensor 22 outputs a signal indicating an occupied state for a parking space in which a parked vehicle is present, and outputs a signal indicating a vacant state for a parking space in which no parked vehicle is present.

A parking situation (that is, an occupied state or a vacant state) of each parking space based on a signal output from the space availability sensor 22 is stored in the storage unit 23 as space availability information. The space availability information is updated at predetermined intervals based on a signal output from the space availability sensor 22. An area map for the parking lot is further stored in the storage unit 23. The area map includes, for example, information indicating the location of each parking space, information indicating the length of a passage space (that is, a space for a vehicle to move in order to access a parking space) in the width direction (hereinafter, referred to as road width where appropriate), risk information, and the like.

The risk information is information that indicates a risk related to a collision between a vehicle and a pedestrian from the viewpoint of the structure of the parking lot. Specifically, the risk information is information that indicates a score commensurate with the risk of each point in the parking lot. The score indicates a relatively high value at a place at which it is predicted that traffic of vehicles and humans is relatively high. Examples of the place include places near pedestrian crossings in the parking lot, places near the entrance and exit of the parking lot, places near the entrance and exit of commercial facilities in the case where the parking lot and the commercial facilities are next to each other, and intersections of passage spaces in the parking lot. Hereinafter, points of which the score is a relatively high value are referred to as high risk points where appropriate.

The drive assist apparatus 100 is configured to be able to autonomously drive the vehicle 10 in the parking lot by controlling each of the powertrain 14, the brake actuator 15, and the steering actuator 16.

The upper limit vehicle speed computing unit 101 that is part of the drive assist apparatus 100 acquires the space availability information and the area map from the parking lot-side device 20 via the communication unit 11, and acquires the location of the vehicle 10, detected by the location detection unit 12. The upper limit vehicle speed computing unit 101 identifies the road width of a passage space in which the vehicle 10 is currently moving, based on the location of the vehicle 10 and the area map, and sets a base upper limit vehicle speed commensurate with the identified road width.

Figure 2:
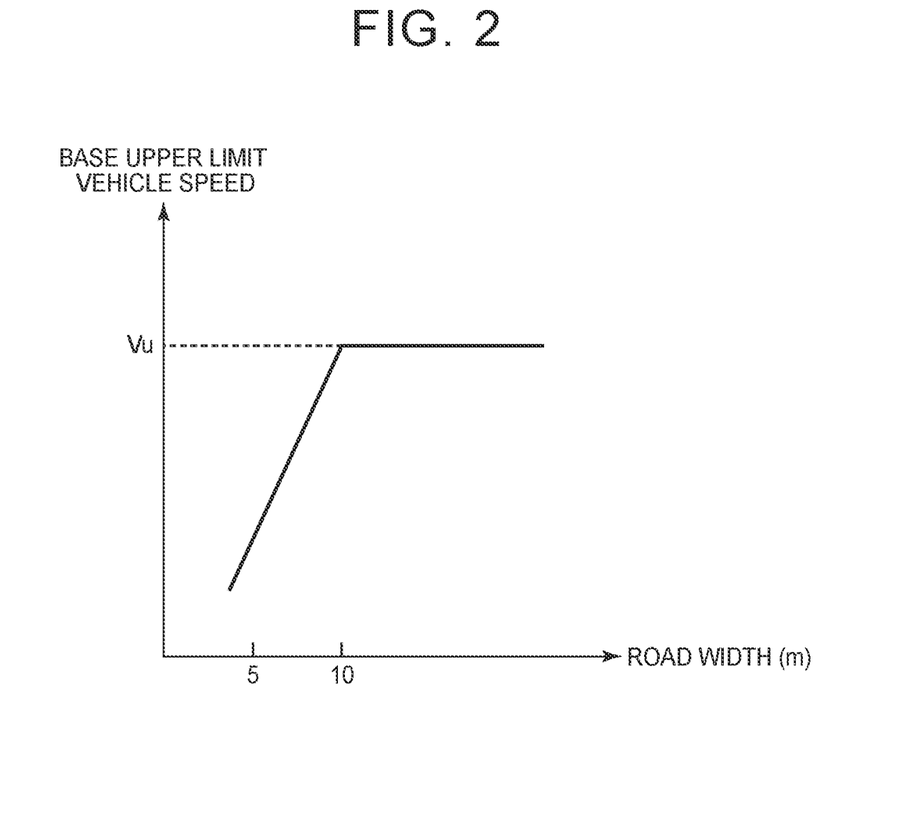
FIG. 2 is a graph that shows an example of the relation between a road width and a base upper limit vehicle speed.

As shown in FIG. 2, the base upper limit vehicle speed is defined in relation to the road width. In FIG. 2, Vu is set based on an allowable deceleration for hard braking to avoid a collision with a pedestrian in the parking lot. For example, when the allowable deceleration is 0.1 G, Vu is approximately 17 kilometers per hour. For example, when the allowable deceleration is 0.2 G, Vu is approximately 34 kilometers per hour. The allowable deceleration is set as an example of a value that does not significantly influence a driver, or the like, of the vehicle 10 as a result of the hard braking.

The upper limit vehicle speed computing unit 101 identifies a parking situation of each of a plurality of parking spaces that adjoin a passage space in which the vehicle 10 is currently moving, based on the location of the vehicle 10, the area map, and the space availability information. Here, a parking space in which a parked vehicle is present is referred to as occupied parking space (occupied space), and a parking space in which no parked vehicle is present is referred to as vacant parking space (vacant space). When consecutive vacant parking spaces are present over a first predetermined section or longer along a direction in which the passage space extends on each of the right and left sides of the vehicle 10 among parking spaces that adjoin the passage space, the upper limit vehicle speed computing unit 101 sets a vehicle speed obtained by adding a predetermined vehicle speed to the base upper limit vehicle speed (hereinafter, referred to as added upper limit vehicle speed where appropriate) as an upper limit vehicle speed for the vehicle 10 on condition that the location of the vehicle 10 is other than the high risk points that are identified based on the risk information included in the area map.

On the other hand, when consecutive vacant parking spaces are not present over the first predetermined section or longer in the direction in which the passage space extends on at least any one of the right and left sides of the vehicle 10 among the parking spaces that adjoin the passage space (or when consecutive vacant parking spaces are present over the first predetermined section or longer along the direction in which the passage space extends on each of the right and left sides of the vehicle 10 among the parking spaces that adjoin the passage space but the location of the vehicle 10 is one of the high risk points), the upper limit vehicle speed computing unit 101 sets the base upper limit vehicle speed as an upper limit vehicle speed for the vehicle 10.

The first predetermined section is a value for determining whether to add a predetermined vehicle speed to a base upper limit vehicle speed. The first predetermined section may be, for example, set as a lower limit value of a section (distance) in which the amplitude of the longitudinal acceleration of the vehicle 10 when the vehicle 10 is accelerated from a base upper limit vehicle speed to an added upper limit vehicle speed and then decelerated from the added upper limit vehicle speed to the base upper limit vehicle speed becomes smaller than or equal to an allowable value.

The pedestrian location computing unit 102 that is part of the drive assist apparatus 100 computes the location of a pedestrian around the vehicle 10 based on a signal output from the environment monitoring sensor 13. The location of a pedestrian is not limited to coordinates (for example, latitude and longitude) or a distance from the vehicle 10. The location of a pedestrian may be indicated by, for example, a time to collision (TTC), or the like.

The target acceleration/deceleration computing unit 103 that is part of the drive assist apparatus 100 controls each of the powertrain 14 and the brake actuator 15 such that the vehicle speed of the vehicle 10 does not exceed the upper limit vehicle speed set by the upper limit vehicle speed computing unit 101. In addition, when it is determined that there is a possibility of a collision between the vehicle 10 and a pedestrian based on the location of the pedestrian, computed by the pedestrian location computing unit 102, the target acceleration/deceleration computing unit 103 controls the brake actuator 15 in order to decelerate or stop the vehicle 10.

The moving route computing unit 104 that is part of the drive assist apparatus 100 computes a moving route of the vehicle 10 based on the location of the vehicle 10, the area map, and the space availability information. The moving route computing unit 104 controls the steering actuator 16 such that the vehicle 10 moves along the computed moving route.

Specifically, for example, the moving route computing unit 104 identifies the parking situation of each of a plurality of parking spaces that adjoin a passage space in which the vehicle 10 is currently moving, based on the location of the vehicle 10, the area map, and the space availability information. When consecutive vacant parking spaces are present over a second predetermined section or longer along the direction in which the passage space extends among parking spaces that adjoin the passage space on one of the right and left sides of the vehicle 10 and when parking spaces that adjoin the passage space on the other one of the right and left sides of the vehicle 10 and that face the vacant parking spaces are occupied, the moving route computing unit 104 computes a moving route along which the vehicle 10 moves in the passage space near the one of the right and left sides of the vehicle 10.

On the other hand, when consecutive vacant parking spaces are not present over the second predetermined section or longer on any of the right and left sides of the vehicle 10 among parking spaces that adjoin the passage space (or when consecutive vacant parking spaces are present over the second predetermined section or longer on each of the right and left sides of the vehicle 10 among parking spaces that adjoin the passage space), the moving route computing unit 104 computes a moving route along which the vehicle 10 moves in the middle of the passage space.

The second predetermined section is a value for determining whether to set a moving route along which the vehicle 10 moves near one side of a passage space. The second predetermined section may be, for example, set as a lower limit value of a section (distance) in which the amplitude of at least one of the lateral acceleration and yaw rate of the vehicle 10 when the vehicle 10 moves from the middle of a passage space over to one side of the passage space and then moves from the one side to the middle becomes smaller than or equal to an allowable value.

Drive Assist Process

A drive assist process that is executed by the drive assist apparatus 100 in the thus configured parking system 1 will be described with reference to the flowchart of FIG. 3.

Figure 3:
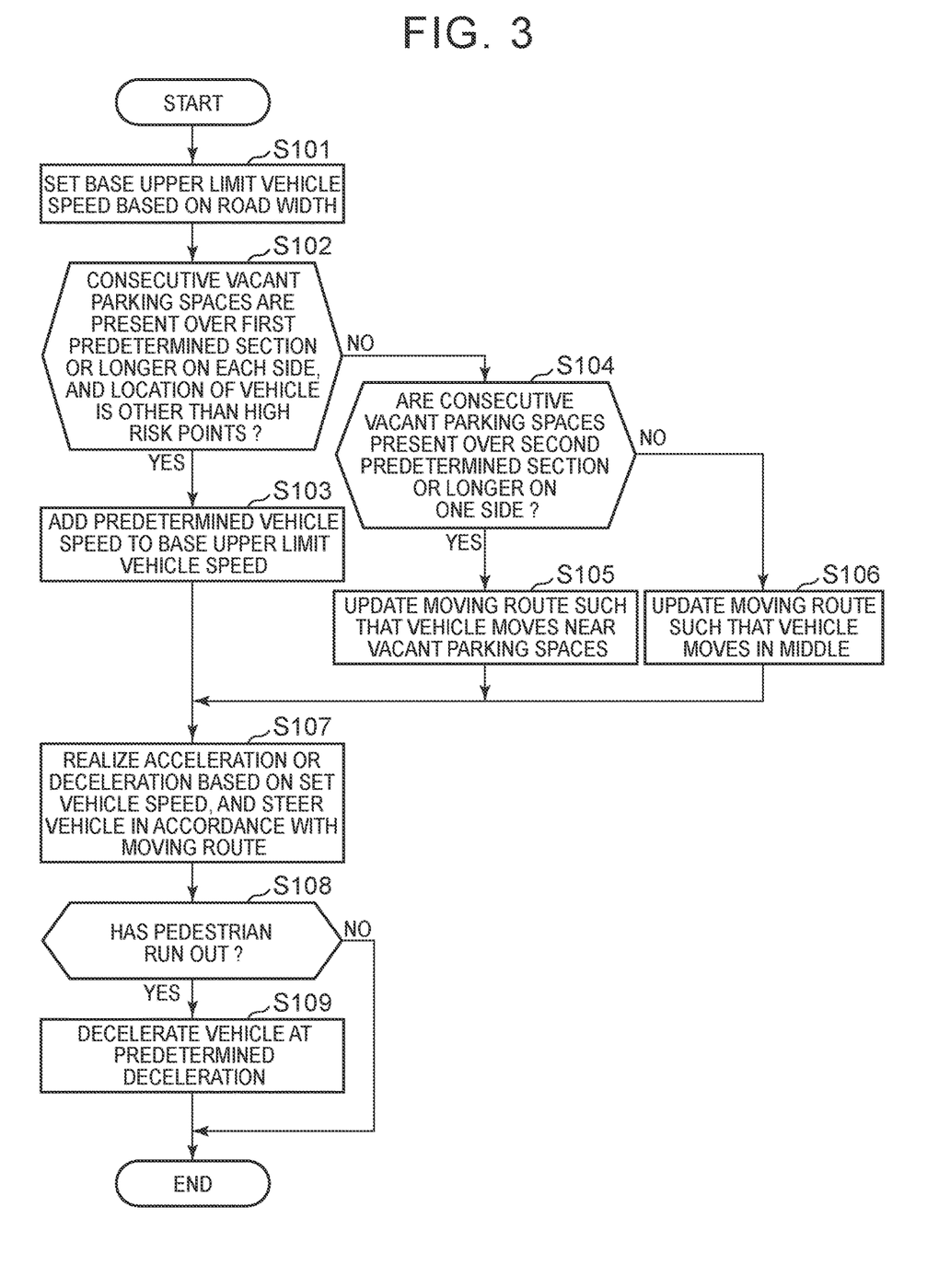
FIG. 3 is a flowchart that shows a drive assist process according to the first embodiment.
Figure 4A:
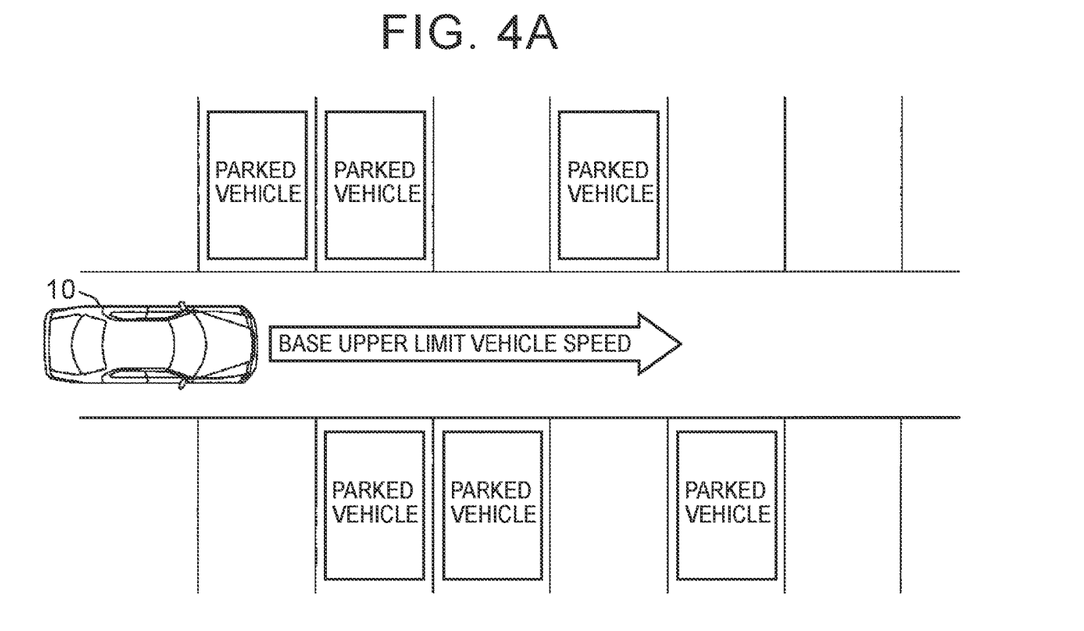
FIG. 4A is a view that shows an example of a speed of a vehicle according to the first embodiment.
Figure 4B:
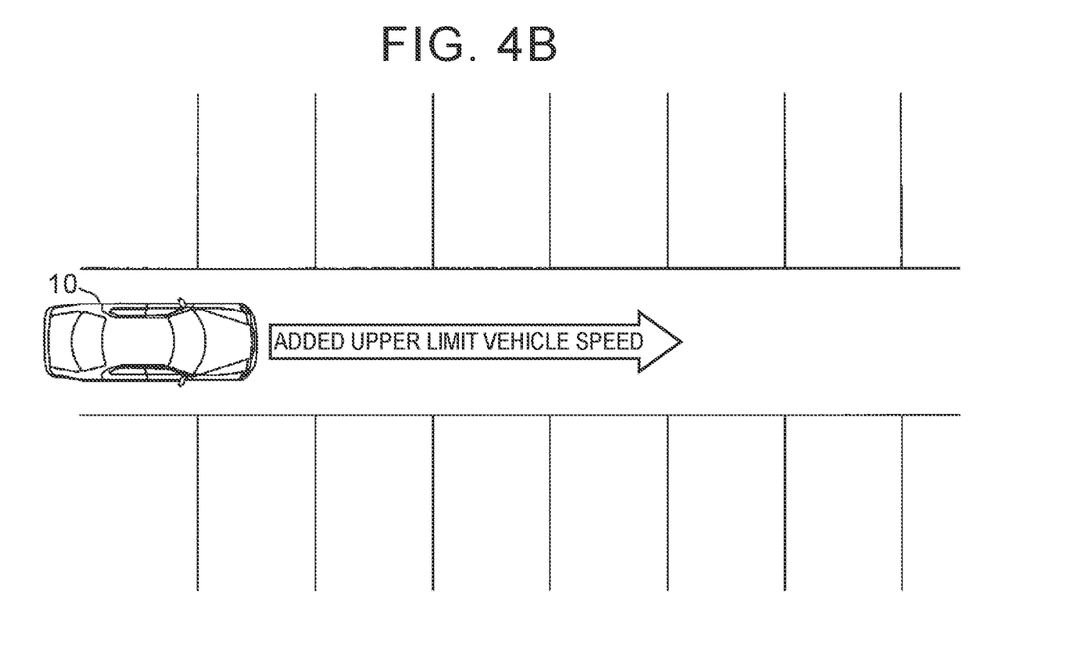
FIG. 4B is a view that shows another example of a speed of the vehicle according to the first embodiment.
Figure 5A:
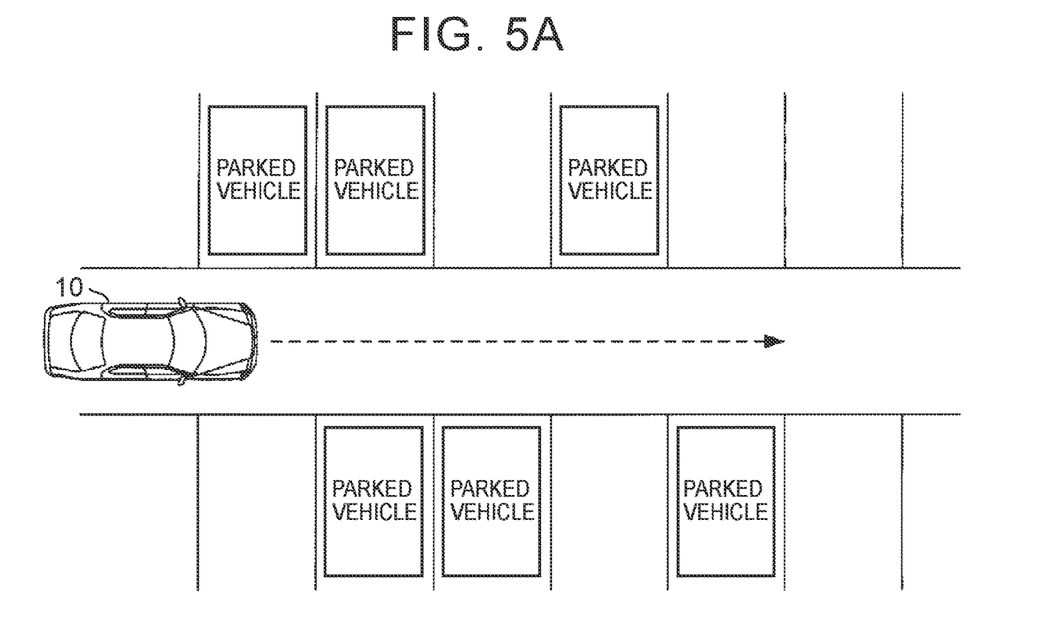
FIG. 5A is a view that shows an example of a moving route of the vehicle according to the first embodiment.
Figure 5B:
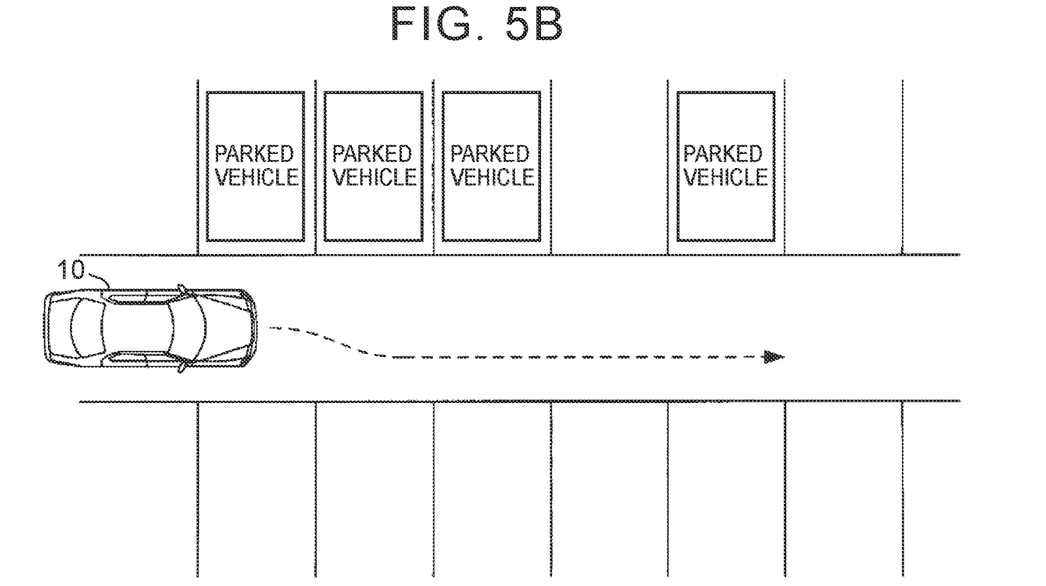
FIG. 5B is a view that shows another example of a moving route of the vehicle according to the first embodiment.

As shown in FIG. 3, the upper limit vehicle speed computing unit 101 acquires space availability information and an area map from the parking lot-side device 20 via the communication unit 11, and acquires the location of the vehicle 10, detected by the location detection unit 12. The upper limit vehicle speed computing unit 101 identifies the road width of a passage space in which the vehicle 10 is currently moving, based on the location of the vehicle 10 and the area map, and sets a base upper limit vehicle speed commensurate with the identified road width (step S101).

Subsequently, the upper limit vehicle speed computing unit 101 identifies the parking situation of each of a plurality of parking spaces that adjoin the passage space in which the vehicle 10 is currently moving, based on the location of the vehicle 10, the area map, and the space availability information. The upper limit vehicle speed computing unit 101 determines whether consecutive vacant parking spaces are present over the first predetermined section or longer along a direction in which the passage space extends on each of the right and left sides of the vehicle 10 among parking spaces that adjoin the passage space and the location of the vehicle 10 is other than the high risk points (step S102).

When it is determined in step S102 that consecutive vacant parking spaces are present over the first predetermined section or longer along the direction in which the passage space extends on each of the right and left sides of the vehicle 10 among the parking spaces that adjoin the passage space and the location of the vehicle 10 is other than the high risk points (Yes in step S102), the upper limit vehicle speed computing unit 101 obtains an added upper limit vehicle speed by adding a predetermined vehicle speed to the base upper limit vehicle speed, and sets the added upper limit vehicle speed to an upper limit vehicle speed for the vehicle 10 (step S103). In this case, the moving route computing unit 104 computes a moving route along which the vehicle 10 moves in the middle of the passage space.

On the other hand, when it is determined in step S102 that consecutive vacant parking spaces are not present over the first predetermined section or longer along the direction in which the passage space extends on at least one of the right and left sides of the vehicle 10 among the parking spaces that adjoin the passage space or when the location of the vehicle 10 is not the point other than the high risk points, that is, the location of the vehicle 10 is one of the high risk points (No in step S102), the upper limit vehicle speed computing unit 101 sets the base upper limit vehicle speed as the upper limit vehicle speed for the vehicle 10. The moving route computing unit 104 identifies the parking situation of each of the plurality of parking spaces that adjoin the passage space in which the vehicle 10 is currently moving, based on the location of the vehicle 10, the area map, and the space availability information. The moving route computing unit 104 determines whether consecutive vacant parking spaces are present over the second predetermined section or longer along the direction in which the passage space extends among parking spaces that adjoin the passage space on one of the right and left sides of the vehicle 10 and parking spaces that adjoin the passage space on the other one of the right and left sides of the vehicle 10 and that face the vacant parking spaces are occupied (step S104).

When it is determined in step S104 that consecutive vacant parking spaces are present over the second predetermined section or longer along the direction in which the passage space extends among the parking spaces that adjoin the passage space on one of the right and left sides of the vehicle 10 and the parking spaces that adjoin the passage space on the other one of the right and left sides of the vehicle 10 and that face the vacant parking spaces are occupied (Yes in step S104), the moving route computing unit 104 computes a moving route along which the vehicle 10 moves near the one of the right and left sides in the passage space (step S105). As a result, a moving route computed in the last process is updated.

On the other hand, when it is determined in step S104 that consecutive vacant parking spaces are not present over the second predetermined section or longer on any of the right and left sides of the vehicle 10 among the parking spaces that adjoin the passage space or when it is determined in step S104 that consecutive vacant parking spaces are present over the second predetermined section or longer not only on one of the right and left sides of the vehicle 10, that is, on each of the right and left sides of the vehicle 10, among the parking spaces that adjoin the passage space (No in step S104), the moving route computing unit 104 computes a moving route along which the vehicle 10 moves in the middle of the passage space (step S106). As a result, a moving route computed in the last process is updated.

After step S103, step S105, or step S106, the target acceleration/deceleration computing unit 103 controls each of the powertrain 14 and the brake actuator 15 such that the vehicle speed of the vehicle 10 does not exceed the upper limit vehicle speed set by the upper limit vehicle speed computing unit 101 (step S107). The moving route computing unit 104 controls the steering actuator 16 such that the vehicle 10 moves along the computed moving route (step S107). Specifically, when the process of step S107 is executed after the process of step S103, the vehicle 10 moves in the middle of the passage space at the added upper limit vehicle speed, as shown in, for example, FIG. 4B. When the process of step S107 is executed after the process of step S105, the vehicle 10 moves near one side in the passage space at the base upper limit vehicle speed, as indicated by, for example, the broken-line arrow in FIG. 5B. When the process of step S107 is executed after the process of step S106, the vehicle 10 moves in the middle of the passage space at the base upper limit vehicle speed, as shown in, for example, FIG. 4A or indicated by, for example, the broken-line arrow in FIG. 5A.

In parallel with the process of step S107, the target acceleration/deceleration computing unit 103 determines whether a pedestrian has run out in front of the vehicle 10 from, for example, behind a parked vehicle, based on the location of the pedestrian, computed by the pedestrian location computing unit 102 (step S108). When it is determined that no pedestrian has run out in front of the vehicle 10 (that is, no pedestrian is present in front of the vehicle 10) (No in step S108), the drive assist process shown in FIG. 3 is ended. After that, the drive assist process shown in FIG. 3 is started again after a lapse of a predetermined period of time (for example, several milliseconds to several tens of milliseconds). That is, the drive assist process shown in FIG. 3 is repeatedly executed at intervals corresponding to the predetermined period of time.

On the other hand, when it is determined in step S108 that a pedestrian has run out in front of the vehicle 10 (Yes in step S108), the target acceleration/deceleration computing unit 103 controls the brake actuator 15 in order to decelerate or stop the vehicle 10 (step S109). After that, the drive assist process shown in FIG. 3 is started again after a lapse of the predetermined period of time.

The area map may be, for example, stored in advance in the vehicle 10 as part of a map database for a navigation system (not shown).

Technical Advantageous Effects (1) On the assumption that a signal output from the environment monitoring sensor 13 is used when an upper limit vehicle speed and moving route of the vehicle 10 are set, in a parking lot in which it is relatively highly likely that parked vehicles are present in front of the vehicle 10 (in other words, it is relatively highly likely that blind spots are provided by the parked vehicles), it is difficult to recognize a situation over the parked vehicles (that is, objects present over the parked vehicles). For this reason, the upper limit vehicle speed and moving route of the vehicle 10 are set and updated for each relatively narrow range that is recognizable based on a signal output from the environment monitoring sensor 13 As a result, the upper limit vehicle speed and moving route of the vehicle 10 can be possibly changed relatively frequently, and hunting can possibly occur in at least one of the longitudinal acceleration, lateral acceleration, and yaw rate of the vehicle 10.

Hence, in the present embodiment, the upper limit vehicle speed and moving route of the vehicle 10 are set with space availability information. As described above, the space availability information indicates the parking situation of each parking space based on a signal output from the space availability sensor 22. For this reason, even when a relatively large number of parked vehicles are present, the drive assist apparatus 100 (particularly, the upper limit vehicle speed computing unit 101 and the moving route computing unit 104) is able to recognize parking situations over a wider range as compared to when a signal output from the environment monitoring sensor 13 is used. That is, the drive assist apparatus 100 is able to incorporate the situation of an area, which is not able to be recognized based on a signal output from the environment monitoring sensor 13, into settings of the upper limit vehicle speed and moving route with the use of space availability information. This reduces the number of times the upper limit vehicle speed and moving route of the vehicle 10 are changed, and also reduces occurrence of hunting of the longitudinal acceleration, or the like, of the vehicle 10.

(2) As shown in FIG. 2, the base upper limit vehicle speed is set in accordance with a distance in the width direction of the passage space (road width). When the road width is relatively narrow (for example, four meters, or the like), a distance between the vehicle 10 and parked vehicles is relatively short. For this reason, the base upper limit vehicle speed is set to a relatively small value such that the vehicle 10 is able to avoid a collision with a pedestrian when the pedestrian has run out from behind the parked vehicles. On the other hand, when the road width is relatively wide (for example, ten meters, or the like), a distance between the vehicle 10 and parked vehicles is relatively long. In addition, when the road width is relatively wide, it is presumable that a pedestrian by himself or herself notices the presence of a moving vehicle, so it is presumable that there is a low possibility that the pedestrian runs out into the passage space carelessly. For this reason, the base upper limit vehicle speed is set to a relatively large value such that relatively smooth movement of the vehicle 10 is realized while it is possible to avoid a collision between the vehicle 10 and a pedestrian.

The base upper limit vehicle speed is set in consideration of not only the above-described road width but also an allowable deceleration set as a value that does not significantly influence a driver, or the like, of the vehicle 10 due to hard braking for avoiding a collision between the vehicle 10 and a pedestrian. For this reason, with the drive assist apparatus 100, when a pedestrian has run out in front of the vehicle 10 that is moving at the base upper limit vehicle speed, a collision between the vehicle 10 and the pedestrian is, of course, avoided, and a driver, or the like, of the vehicle 10 is not significantly influenced due to the hard braking.

(3) As described above, the upper limit vehicle speed computing unit 101 sets an added upper limit vehicle speed to an upper limit vehicle speed for the vehicle 10 when consecutive vacant parking spaces are present over the first predetermined section or longer in a direction in which a passage space in which the vehicle 10 is currently moving extends on each of the right and left sides of the vehicle 10 among parking spaces that adjoin the passage space and the location of the vehicle 10 is other than the high risk points. With this configuration, it is possible to relatively early recognize a pedestrian, and it is also possible to cause the vehicle 10 to relatively smoothly move in a passage space in which there is a low possibility that a pedestrian runs out in front of the vehicle 10.

This technical advantageous effect is similarly obtained also when the upper limit vehicle speed is decreased in the case where a relatively large number (for example, a first number) of occupied parking spaces are present among a group of parking spaces that adjoin a passage space in which the vehicle 10 is currently moving (that is, parking spaces that adjoin the passage space on one of the right and left sides of the vehicle 10 and parking spaces that adjoin the passage space on the other one of the right and left sides of the vehicle 10) as compared to the case where a relatively small number (for example, a second number smaller than the first number) of occupied parking spaces are present among the group of parking spaces. Furthermore, this technical advantageous effect is similarly obtained also in the case where the upper limit vehicle speed for the vehicle 10 is increased as the number of vacant parking spaces present in the group of parking spaces increases.

(4) As described above, when consecutive vacant parking spaces are present over the second predetermined section or longer along a direction in which a passage space in which the vehicle 10 is currently moving extends among parking spaces that adjoin the passage space on one of the right and left sides of the vehicle 10 and parking spaces that adjoin the passage space on the other one of the right and left sides of the vehicle 10 and that face the vacant parking spaces are occupied, the moving route computing unit 104 computes a moving route along which the vehicle 10 moves in the passage space near one of the right and left sides of the vehicle 10. With this configuration, in comparison with the case where the vehicle 10 is moving in the middle of the passage space, a distance between the vehicle 10 and a pedestrian that has run out from behind a parked vehicle increases, so it is possible to suitably avoid a collision between the vehicle 10 and the pedestrian.

This technical advantageous effect is similarly obtained also in the case where a moving route along which the vehicle 10 moves near a side at which the number of occupied parking spaces is smaller (in other words, a side at which the number of vacant parking spaces is larger) between a group of parking spaces that adjoin a passage space in which the vehicle 10 is currently moving on one of the right and left sides of the vehicle 10 and a group of parking spaces that adjoin the passage space on the other one of the right and left sides of the vehicle 10 is computed.

Second Embodiment

A second embodiment of the drive assist apparatus will be described with reference to FIG. 6, FIG. 7A, and FIG. 7B.

In the above-described first embodiment, the upper limit vehicle speed and the moving route are set by the vehicle 10. In the following second embodiment, the upper limit vehicle speed and the moving route are set by the parking lot-side device 20. The other components are similar to those of the above-described first embodiment. Like reference numerals in the second embodiment denote common components in the drawings, and a description that overlaps with that of the first embodiment is omitted as needed. Basically, only different components will be described with reference to FIG. 6, FIG. 7A, and FIG. 7B.

Configuration

Figure 6:
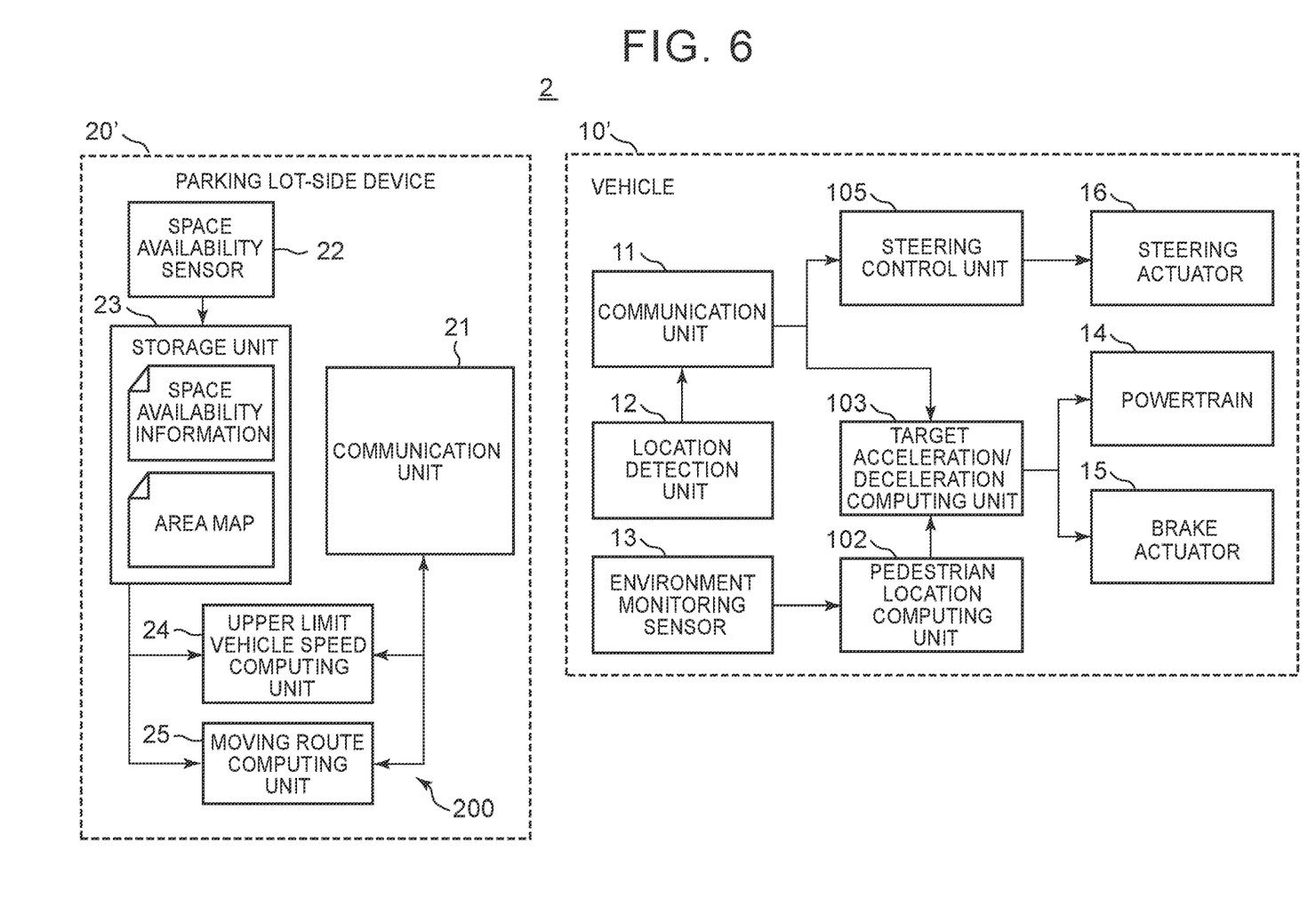
FIG. 6 is a block diagram that shows the configuration of a parking system according to a second embodiment.

As shown in FIG. 6, a parking system 2 includes a vehicle 10' and a parking lot-side device 20'. The vehicle 10' includes the communication unit 11, the location detection unit 12, the environment monitoring sensor 13, the powertrain 14, the brake actuator 15, the steering actuator 16, the pedestrian location computing unit 102, the target acceleration/deceleration computing unit 103, and a steering control unit 105. The parking lot-side device 20' includes the communication unit 21, the space availability sensor 22, the storage unit 23, the upper limit vehicle speed computing unit 24, and the moving route computing unit 25. The upper limit vehicle speed computing unit 24, the moving route computing unit 25, and the communication unit 21 constitute a drive assist apparatus 200 according to the second embodiment.

The target acceleration/deceleration computing unit 103 controls each of the powertrain 14 and the brake actuator 15, and the steering control unit 105 controls the steering actuator 16. Thus, the target acceleration/deceleration computing unit 103 and the steering control unit 105 are configured to be able to autonomously drive the vehicle 10' in a parking lot.

Drive Assist Process

Next, a drive assist process that is executed by the drive assist apparatus 200 in the parking system 2 will be described with reference to the flowcharts of FIG. 7A and FIG. 7B.

Figure 7A:
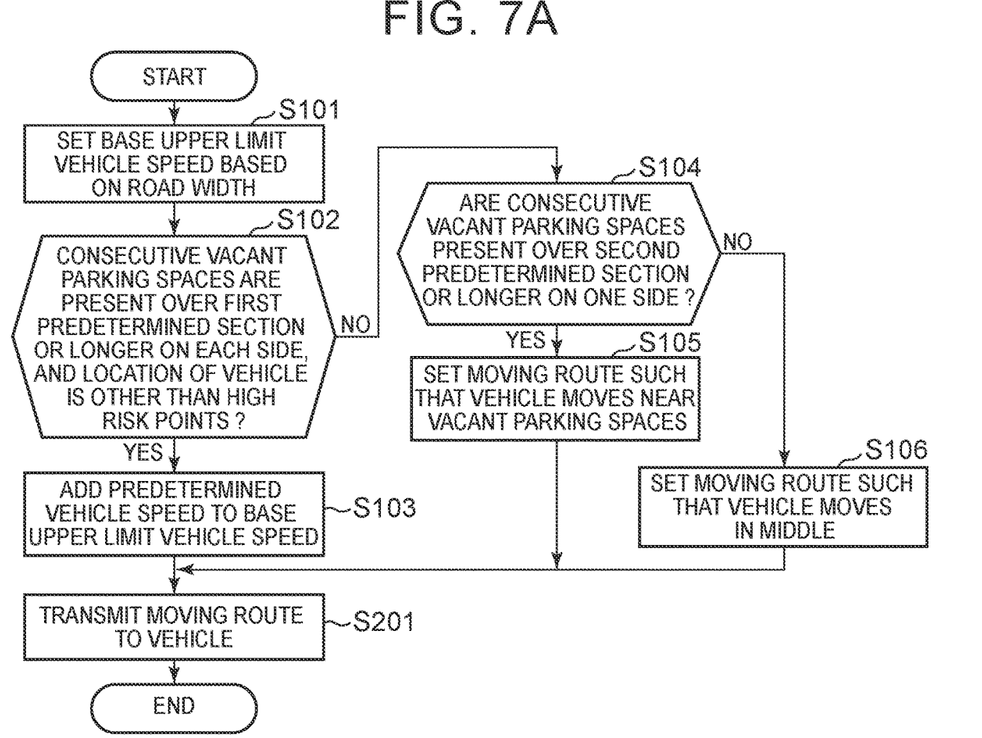
FIG. 7A is a flowchart that shows a process that is executed by a parking lot-side device in a drive assist process according to the second embodiment.

As shown in FIG. 7A, the upper limit vehicle speed computing unit 24 acquires the location of a vehicle 10' that is an intended vehicle from the vehicle 10' via the communication unit 21, and acquires space availability information and an area map from the storage unit 23. Identification information for identifying a vehicle 10' is typically added to information that indicates the location of the vehicle 10'. The upper limit vehicle speed computing unit 24 identifies the road width of a passage space in which the vehicle 10' is currently moving, based on the location of the vehicle 10' and the area map, and sets a base upper limit vehicle speed commensurate with the identified road width (step S101).

Subsequently, the upper limit vehicle speed computing unit 24 identifies the parking situation of each of a plurality of parking spaces that adjoin the passage space in which the vehicle 10' is currently moving, based on the location of the vehicle 10', the area map, and the space availability information. The upper limit vehicle speed computing unit 24 determines whether consecutive vacant parking spaces are present over the first predetermined section or longer along a direction in which the passage space extends on each of the right and left sides of the vehicle 10' among parking spaces that adjoin the passage space and the location of the vehicle 10' is other than the high risk points (step S102).

When it is determined in step S102 that consecutive vacant parking spaces are present over the first predetermined section or longer along the direction in which the passage space extends on each of the right and left sides of the vehicle 10' among the parking spaces that adjoin the passage space and the location of the vehicle 10' is other than the high risk points (Yes in step S102), the upper limit vehicle speed computing unit 24 obtains an added upper limit vehicle speed by adding a predetermined vehicle speed to the base upper limit vehicle speed, and sets the added upper limit vehicle speed as an upper limit vehicle speed for the vehicle 10' (step S103). In this case, the moving route computing unit 25 computes a moving route along which the vehicle 10' moves in the middle of the passage space.

On the other hand, when it is determined in step S102 that consecutive vacant parking spaces are not present over the first predetermined section or longer along the direction in which the passage space extends on at least one of the right and left sides of the vehicle 10' among the parking spaces that adjoin the passage space or when the location of the vehicle 10' is not the point other than the high risk points, that is, the location of the vehicle 10' is one of the high risk points (No in step S102), the upper limit vehicle speed computing unit 24 sets the base upper limit vehicle speed as the upper limit vehicle speed for the vehicle 10'. The moving route computing unit 25 identifies the parking situation of each of the plurality of parking spaces that adjoin the passage space in which the vehicle 10' is currently moving, based on the location of the vehicle 10', the area map, and the space availability information. The moving route computing unit 25 determines whether consecutive vacant parking spaces are present over the second predetermined section or longer along the direction in which the passage space extends among the parking spaces that adjoin the passage space on one of the right and left sides of the vehicle 10' and parking spaces that adjoin the passage space on the other side of the right and left sides of the vehicle 10' and that face the vacant parking spaces are occupied (step S104).

When it is determined in step S104 that consecutive vacant parking spaces are present over the second predetermined section or longer along the direction in which the passage space extends among the parking spaces that adjoin the passage space on the one of the right and left sides of the vehicle 10' and the parking spaces that adjoin the passage space on the other one of the right and left sides of the vehicle 10' and that face the vacant parking spaces are occupied (Yes in step S104), the moving route computing unit 25 computes a moving route along which the vehicle 10' moves near the one of the right and left sides in the passage space (step S105).

On the other hand, when it is determined in step S104 that consecutive vacant parking spaces are not present over the second predetermined section or longer on any of the right and left sides of the vehicle 10' among the parking spaces that adjoin the passage space or consecutive vacant parking spaces are present over the second predetermined section or longer not only on one of the right and left sides of the vehicle 10', that is, on each of the right and left sides of the vehicle 10', among the parking spaces that adjoin the passage space (No in step S104), the moving route computing unit 25 computes a moving route along which the vehicle 10' moves in the middle of the passage space (step S106).

After step S103, step S105, or step S106, the upper limit vehicle speed set by the upper limit vehicle speed computing unit 24 and the moving route computed by the moving route computing unit 25 are transmitted to the vehicle 10' via the communication unit 21 (step S201).

Figure 7B:
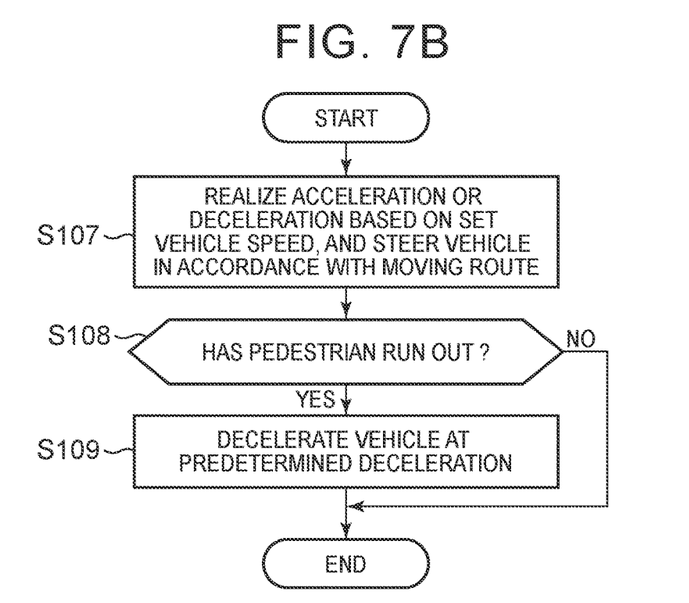
FIG. 7B is a flowchart that shows a process that is executed by a vehicle in the drive assist process according to the second embodiment.

As shown in FIG. 7B, the target acceleration/deceleration computing unit 103 of the vehicle 10' that has received the upper limit vehicle speed and the moving route controls each of the powertrain 14 and the brake actuator 15 such that the vehicle speed of the vehicle 10' does not exceed the upper limit vehicle speed (step S107). The steering control unit 105 controls the steering actuator 16 such that the vehicle 10' moves along the moving route (step S107). In parallel with the process of step S107, the process of step S108 is executed.

Technical Advantageous Effects

With the drive assist apparatus 200 according to the present embodiment, particularly, it is possible to reduce a processing load on the vehicle 10'.

Alternative Embodiments

In the above-described first and second embodiments, the vehicle 10 or the vehicle 10' is autonomously driven in the parking lot. However, the corresponding drive assist apparatus is applicable also to the case where a driver maneuvers the vehicle 10 or the vehicle 10'.

In this case, for example, the target acceleration/deceleration computing unit 103 of the vehicle 10 is configured to be able to control each of the powertrain 14 and the brake actuator 15 irrespective of a depression amount of an accelerator pedal (not shown) or a depression amount of a brake pedal (not shown). When the vehicle speed of the vehicle 10 exceeds the upper limit vehicle speed set by the upper limit vehicle speed computing unit 101 or the upper limit vehicle speed computing unit 24 as a result of the fact that the driver of the vehicle 10 has depressed the accelerator pedal, the target acceleration/deceleration computing unit 103 controls the powertrain 14 such that the vehicle speed of the vehicle 10 does not exceed the upper limit vehicle speed.

When the target acceleration/deceleration computing unit 103 determines that a pedestrian has run out in front of the vehicle 10 based on the location of the pedestrian, computed by the pedestrian location computing unit 102, the target acceleration/deceleration computing unit 103 controls the brake actuator 15 in order to decelerate or stop the vehicle 10. For example, a technique related to existing collision mitigation braking just needs to be applied to the control over the brake actuator 15.

The moving route computed by the moving route computing unit 104 or the moving route computing unit 25 may be informed to the driver of the vehicle 10 by, for example, human machine interface (HMI) (not shown), or the like.

Various aspects of the disclosure, which are derived from the above-described embodiments and alternative embodiments, will be described below.

A drive assist apparatus according to a first aspect of the disclosure includes an electronic control unit configured to: acquire space availability information that indicates whether each of a plurality of parking spaces in a parking lot is an occupied space or a vacant space; and set at least one of a speed of a vehicle that moves in the parking lot and a moving route of the vehicle based on the space availability information.

A drive assist apparatus according to a second aspect of the disclosure includes: acquiring means configured to acquire space availability information that indicates a parking situation of each of a plurality of parking spaces in a parking lot; setting means configured to set at least one of a speed of a vehicle that moves in the parking lot and a moving route of the vehicle based on the space availability information; and controlling means configured to control an actuator such that the vehicle moves with automatic steering based on at least one of the speed and the moving route.

The parking situations that are indicated by the space availability information are linked with a possibility that a pedestrian runs out from behind a parked vehicle. That is, if there are a relatively large number of parked vehicles, there are a relatively large number of blind spots caused by the parked vehicles, so a driver of the intended vehicle is difficult to recognize a pedestrian, and there is a high possibility that a pedestrian runs out without noticing a vehicle. On the other hand, if there are a relatively small number of parked vehicles, there are a relatively small number of blind spots caused by the parked vehicles, so both the driver of the intended vehicle and a pedestrian are relatively easy to recognize each other. Therefore, with the drive assist apparatus that sets at least one of the speed of the intended vehicle and the moving route of the intended vehicle based on the space availability information, it is possible to assist driving in consideration of pedestrian's running out from behind a parked vehicle.

When the drive assist apparatus is mounted on an intended vehicle, the drive assist apparatus sets at least one of the speed and the moving route for the host vehicle that is the intended vehicle based on space availability information. Alternatively, when the drive assist apparatus is installed outside an intended vehicle, the drive assist apparatus sets a plurality of vehicles that move in a parking lot as the intended vehicles, sets at least one of the speed and the moving route based on space availability information for each of the plurality of vehicles.

In the above aspect, the electronic control unit may be configured to: acquire an occupied space count based on the space availability information, the occupied space count being the number of the occupied spaces among a plurality of parking spaces which exist within a predetermined range from the vehicle moving in a passage space; and set at least one of the speed and the moving route based on the occupied space count.

In the above aspect, the electronic control unit may be configured to: acquire the occupied space count among a plurality of parking spaces that adjoin the passage space; and set a speed of the vehicle when the occupied space count is a first value as a speed lower than a speed of the vehicle when the occupied space count is a second value smaller than the first value. The second value may be zero.

According to this aspect, when there are a relatively large number of parked vehicles, the speed of the intended vehicle is decreased as compared to when there are a relatively small number of parked vehicles. Therefore, even if a pedestrian runs out from behind a parked vehicle, it is expected to avoid a collision between the intended vehicle and the pedestrian.

In the above aspect, the electronic control unit may be configured to: acquire a first occupied space count among a first parking space group and a second occupied space count among a second parking space group, the first parking space group including a plurality of parking spaces that adjoin the passage space on one side in a vehicle width direction, the second parking space group including a plurality of parking spaces that adjoin the passage space on the other side in the width direction; and set, when the first occupied space count is smaller than the second occupied space count, the moving route such that the vehicle moves in part of the passage space which is closer to the first parking space group than to the second parking space group.

According to this aspect, it is possible to relatively increase a distance between the intended vehicle and parked vehicles at a side at which there are a relatively large number of parked vehicles and there is a relatively high possibility that a pedestrian runs out. Therefore, even if a pedestrian runs out from behind a parked vehicle, it is expected to avoid a collision between the intended vehicle and the pedestrian.

In the above aspect, the electronic control unit may be configured to: acquire consecutive vacant space information that indicates whether consecutive vacant spaces exist, the consecutive vacant spaces being a predetermined number or more of the consecutive vacant spaces along a direction in which a passage space extends among parking spaces that adjoin the passage space, the vehicle being moving in the passage space; and set at least one of the speed and the moving route based on the consecutive vacant space information.

In the above aspect, the electronic control unit may be configured to set a speed when the consecutive vacant spaces exist in both a first parking space group and a second parking space group as a speed lower than a speed when the consecutive vacant spaces exist in the first parking space group and no consecutive vacant spaces exist in the second parking space group, the first parking space group including parking spaces that adjoin the passage space on one side in a vehicle width direction, the second parking space group including parking spaces that adjoin the passage space on the other side in the vehicle width direction. In the above-described embodiments, the first predetermined section corresponds to an example of the predetermined number.

According to this aspect, when the predetermined number or more of consecutive parking spaces where no parked vehicles are present are present (that is, when the intended vehicle moves in a place where visibility is relatively high and there is a relatively low possibility that a pedestrian runs out), it is possible to realize smooth movement of the intended vehicle.

In the above aspect, the electronic control unit may be configured to set, when the consecutive vacant spaces exist in a first parking space group and at least one of parking spaces that faces the consecutive vacant spaces, among a second parking space group is the occupied space, the moving route such that the vehicle moves in an area of the passage space, the area of the passage space being closer to the first parking space group than to the second parking space group, the first parking space group including parking spaces that adjoin the passage space on one side in a vehicle width direction, the second parking space group including parking spaces that adjoin the passage space on the other side in the vehicle width direction, the first parking space group and the second parking space group facing each other. In the above-described embodiments, the second predetermined section corresponds to an example of the predetermined number.

According to this aspect, since it is possible to cause the intended vehicle to move in a place where there is a relatively low possibility that a pedestrian runs out, it is possible to suitably reduce the possibility of a collision between the intended vehicle and a pedestrian.

In the above aspect, the electronic control unit may be configured to: acquire width information that indicates a length of a passage space in a vehicle width direction of the vehicle, the vehicle being moving in the passage space; and set at least one of the speed of the vehicle and the moving route of the vehicle based on the space availability information and the width information.

Visibility gets worse as the width of a passage space becomes narrower. That is, as the width of a passage space becomes narrower, a driver of the intended vehicle becomes more difficult to recognize a pedestrian, and a pedestrian is also more difficult to notice a vehicle. In other words, visibility gets better as the width of a passage space becomes wider. That is, as the width of a passage space becomes wider, both a driver of the intended vehicle and a pedestrian become easier to recognize each other. Therefore, with the drive assist apparatus that sets at least one of a speed of the intended vehicle and a moving route of the intended vehicle based on space availability information and width information, it is possible to suitable assist driving in consideration of pedestrian's running out from behind a parked vehicle.

In the above aspect, the electronic control unit may be configured to transmit at least one of the set speed and the set moving route to the vehicle, and the drive assist apparatus may be provided outside the vehicle. According to this aspect, it is possible to reduce a processing load on the intended vehicle (that is, a processing load related to setting of a vehicle speed and a moving route).

In the above aspect, at least one sensor may be provided in the parking lot, the sensor being configured to be able to detect whether a parked vehicle is present in each of the plurality of parking spaces; and the space availability information may be generated based on a signal output from the sensor. According to this aspect, it is possible to relatively easily generate space availability information.

In the above-described embodiments, where a vehicle moves in a passage space is determined as a moving route. Instead, the passage space in which a vehicle moves may be determined based on space availability information over the entire parking lot.

The disclosure is not limited to the above-described embodiments. The disclosure may be modified as needed without departing from the scope or concept of the disclosure, which read from the appended claims and the overall specification. The technical scope of the disclosure also encompasses drive assist apparatuses that include such modifications.

What is claimed is:

1. A drive assist apparatus comprising an electronic control unit configured to:
   acquire space availability information that indicates whether each of a plurality of parking spaces in a parking lot is an occupied space or a vacant space;
   acquire an occupied space count based on the space availability information, the occupied space count being the number of the occupied spaces among a plurality of parking spaces which exist within a predetermined range from a vehicle moving in a passage space;
   set at least one of a speed of the vehicle that moves in the parking lot and a moving route of the vehicle based on the occupied space count; and
   transmit, to the vehicle, information including at least one of the set speed and the set moving route used for controlling movement of the vehicle, and
   wherein the drive assist apparatus is provided outside the vehicle,
   wherein the acquired occupied space count includes a first occupied space count among a first parking space group and a second occupied space count among a second parking space group, the first parking space group including a plurality of parking spaces that adjoin the passage space on one side in a vehicle width direction, the second parking space group including a plurality of parking spaces that adjoin the passage space on the other side in the width direction, and
   when the first occupied space count is smaller than the second occupied space count, the electronic control unit is configured to set the moving route such that the vehicle moves in part of the passage space which is closer to the first parking space group than to the second parking space group.

2. The drive assist apparatus according to claim 1, wherein the electronic control unit is configured to:
   set a speed of the vehicle when the occupied space count is a first value as a speed lower than a speed of the vehicle when the occupied space count is a second value smaller than the first value.

3. The drive assist apparatus according to claim 1, wherein the electronic control unit is configured to:
   acquire width information that indicates a length of a passage space in a vehicle width direction of the vehicle, the vehicle being moving in the passage space; and
   set at least the speed of the vehicle based on the width information.

4. The drive assist apparatus according to claim 1, wherein:
   at least one sensor is provided in the parking lot, the sensor being configured to be able to detect whether a parked vehicle is present in each of the plurality of parking spaces; and
   the space availability information is generated based on a signal output from the sensor.

5. A drive assist apparatus comprising an electronic control unit configured to:
   acquire space availability information that indicates whether each of a plurality of parking spaces in a parking lot is an occupied space or a vacant space;
   set at least one of a speed of a vehicle that moves in the parking lot and a moving route of the vehicle based on the space availability information;
   transmit, to the vehicle, information including at least one of the set speed and the set moving route used for controlling movement of the vehicle,
   wherein the drive assist apparatus is provided outside the vehicle;
   acquire consecutive vacant space information that indicates whether consecutive vacant spaces exist, the consecutive vacant spaces being a predetermined number or more of the consecutive vacant spaces along a direction in which a passage space extends among parking spaces that adjoin the passage space, the vehicle being moving in the passage space; and
   set at least one of the speed and the moving route based on the consecutive vacant space information.

6. The drive assist apparatus according to claim 5, wherein the electronic control unit is configured to set a speed when the consecutive vacant spaces exist in both a first parking space group and a second parking space group as a speed higher than a speed when the consecutive vacant spaces exist in the first parking space group and no consecutive vacant spaces exist in the second parking space group, the first parking space group including parking spaces that adjoin the passage space on one side in a vehicle width direction, the second parking space group including parking spaces that adjoin the passage space on the other side in the vehicle width direction.

7. The drive assist apparatus according to claim 5, wherein the electronic control unit is configured to set, when the consecutive vacant spaces exist in a first parking space group and at least one of parking spaces that faces the consecutive vacant spaces, among a second parking space group is the occupied space, the moving route such that the vehicle moves in an area of the passage space, the area of the passage space being closer to the first parking space group than to the second parking space group, the first parking space group including parking spaces that adjoin the passage space on one side in a vehicle width direction, the second parking space group including parking spaces that adjoin the passage space on the other side in the vehicle width direction, the first parking space group and the second parking space group facing each other.

8. A drive assist apparatus comprising:
an electronic control unit configured to:
acquire space availability information that indicates a parking situation of each of a plurality of parking spaces in a parking lot;
acquire an occupied space count based on the space availability information, the occupied space count being the number of the occupied spaces among a plurality of parking spaces which exist within a predetermined range from a vehicle moving in a passage space;
set at least one of a speed of the vehicle that moves in the parking lot and a moving route of the vehicle based on the occupied space count; and
control an actuator such that the vehicle moves with automatic steering based on at least one of the speed and the moving route,
wherein the acquired occupied space count includes a first occupied space count among a first parking space group and a second occupied space count among a second parking space group, the first parking space group including a plurality of parking spaces that adjoin the passage space on one side in a vehicle width direction, the second parking space group including a plurality of parking spaces that adjoin the passage space on the other side in the width direction; and
set, when the first occupied space count is smaller than the second occupied space count, the moving route such that the vehicle moves in part of the passage space which is closer to the first parking space group than to the second parking space group.

9. A drive assist method using an electronic control unit provided outside a vehicle, comprising:
acquiring space availability information that indicates whether each of a plurality of parking spaces in a parking lot is an occupied space or a vacant space;
acquiring an occupied space count based on the space availability information, the occupied space count being the number of the occupied spaces among a plurality of parking spaces which exist within a predetermined range from the vehicle moving in a passage space;
setting at least one of a speed of the vehicle that moves in the parking lot and a moving route of the vehicle based on the occupied space count; and
transmitting, to the vehicle, information including at least one of the set speed and the set moving route used for controlling movement of the vehicle,
wherein the acquiring the occupied space count includes acquiring a first occupied space count among a first parking space group and a second occupied space count among a second parking space group, the first parking space group including a plurality of parking spaces that adjoin the passage space on one side in a vehicle width direction, the second parking space group including a plurality of parking spaces that adjoin the passage space on the other side in the width direction, and
wherein, when the first occupied space count is smaller than the second occupied space count, setting the moving route such that the vehicle moves in part of the passage space which is closer to the first parking space group than to the second parking space group.

\* \* \* \* \*